United States Patent [19]
Eskeli

[11] 3,758,223
[45] Sept. 11, 1973

[54] REACTION ROTOR TURBINE

[76] Inventor: Michael Eskeli, 6220 Orchid Ln., Dallas, Tex. 75230

[22] Filed: Sept. 30, 1971

[21] Appl. No.: 185,060

[52] U.S. Cl. .................................... 415/1, 415/80
[51] Int. Cl. ........................... F01d 1/00, F01d 1/06
[58] Field of Search ........................ 415/80–87, 1

[56] References Cited
UNITED STATES PATENTS

| | | | |
|---|---|---|---|
| 1,158,978 | 11/1915 | Buchi | 415/87 |
| 1,329,626 | 2/1920 | Oman | 415/80 |
| 2,044,532 | 6/1936 | Kessel | 415/81 |
| 3,032,988 | 5/1962 | Kleckner | 415/80 |

Primary Examiner—Henry F. Raduazo
Attorney—Wofford, Felsman & Fails

[57] ABSTRACT

A method and apparatus for a reaction type turbine rotor, employed in power generation devices, such as steam turbines, hydraulic turbines, or gas turbines. The pressurized fluid is supplied to within said turbine reaction rotor by employing a fluid nozzle arranged to discharge within said wheel in a direction that is approximately the same as the direction of rotation of said rotor wheel. The fluid is then discharged from the rotating rotor wheel nozzles backward away from the direction of rotation; said fluid then will generate a torque on said rotor wheel; said torque is then passed to the rotor shaft as the work output of the device.

6 Claims, 4 Drawing Figures

PATENTED SEP 11 1973
3,758,223
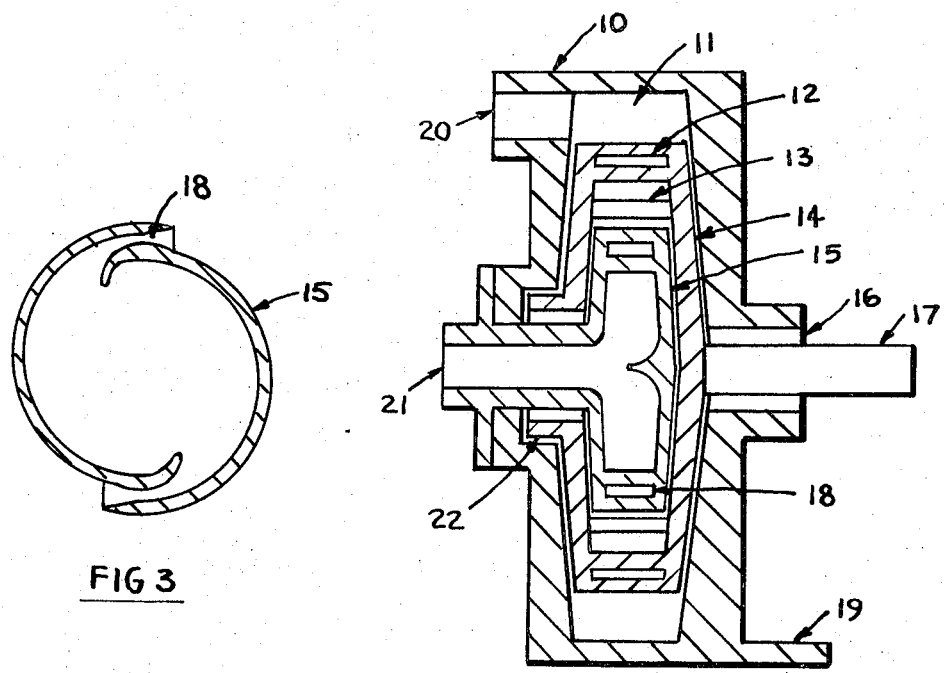
FIG 3
FIG. 1
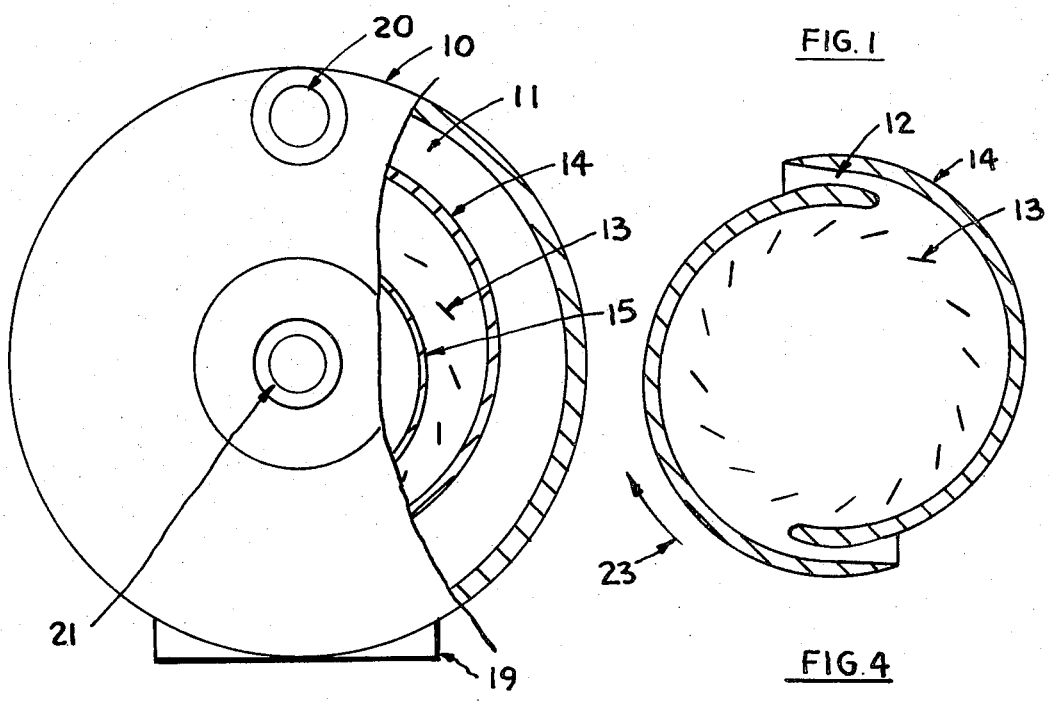
FIG. 2
FIG. 4
INVENTOR.
BY Michael Eskeli

REACTION ROTOR TURBINE

BACKGROUND OF THE INVENTION

This invention relates to power generation devices, and more particularly to turbines employing fluid reaction on the turbine rotor wheel as power generating means.

The art of generating power has seen a variety of devices. Reaction turbines have been built with the pressurized fluid being supplied to the rotor inlet and then discharged to a lower pressure via reaction nozzles mounted on the rotor periphery and discharging said fluid backwards.

The main disadvantage of these conventional devices is that the rotating rotor wheel is required to accelerate said fluid first to the tangential speed of said rotor, before discharge, which results in a reduced power output for the device, and decreases the efficiency of the device.

BRIEF DESCRIPTION OF THE DRAWINGS

FIG. 1 is a cross section of a power generation device employing the reaction rotor, and the tangential fluid feeder.

FIG. 2 is an end view of the device shown in FIG. 1.

FIG. 3 is a sectional end view of the tangential fluid feeder.

FIG. 4 is a sectional end view of the reaction rotor.

DESCRIPTION OF PREFERRED EMBODIMENTS

It is an object of this invention to provide an improved means for generating power by employing a reaction rotor in a turbine, with a tangential fluid feeder to said rotor; these two items forming a stage in a power generation turbine; said stage may be employed either in a steam turbine, a gas turbine or in a hydraulic turbine installation.

Referring to FIG. 1, therein is illustrated a cross section of a power generation device employing said reaction rotor, and tangential fluid feeder. 10 is a casing, 11 is a fluid collection space around the reaction rotor, 12 is a discharge nozzle opening on reaction rotor 14, 13 are fluid guide vanes within said rotor, 16 is a bearing and seal for reaction rotor shaft 17, 18 is a fluid feeder nozzle opening, 19 is base for casing 10, 20 is fluid outlet, 21 is inlet to stationary fluid feeder and 22 is a bearing and seal.

In FIG. 2, 20 is fluid outlet, 21 is fluid inlet, 10 is casing, 11 is fluid space, 14 is rotor, 13 are fluid guide vanes within rotor 14, 15 is the tangential fluid feeder.

In FIG. 3, an end sectional view is shown of the tangential fluid feeder. 18 is a fluid exit nozzle, 15 is the feeder body.

FIG. 4 illustrates the reaction rotor. 14 is the rotor body, 12 are fluid exit nozzle, 13 are fluid guide vanes, and 23 is an arrow indicating the direction of rotation for the rotor.

In operation, the fluid enters the tangential fluid feeder at inlet 21, and is passed to the rotor 14 via exit nozzles 18. Said fluid is accelerated in said exit nozzles, with an accompanying pressure reduction. Within said reaction rotor, said fluid is compressed. Said fluid is then discharged through reaction nozzles mounted near the periphery of said rotor, with said nozzles being arranged to discharge said fluid backward in a direction away from the direction of rotation of said rotor wheel; the velocity of said fluid from said nozzles being dependent on the pressure differential between the exit end and the entry end of said nozzles, and the fluid being used. Torque is produced on said rotor wheel by reaction to the force of said fluid when said fluid passes through said nozzles; said torque is then transmitted to the rotor shaft and from there as the useful work output of the reaction rotor turbine stage. It should be noted that the fluid pressure for this device is normally higher upstream of the feeder inlet, than downstream of the reaction rotor nozzle outlet.

The feeder nozzles, 18 in FIG. 3, are normally converging, or converging-diverging, in shape, depending of the fluid being used. The purpose of these nozzles is to provide for highest attainable exit velocity from these nozzles for the pressure and enthalpy differentials available between entry and exit conditions for these nozzles. The feeder unit, FIG. 3, is shown to be round in shape; this shape was selected to provide for least fluid resistance on the exterior of said unit. Other feeder shapes may be used, such as pipes, with the nozzles attached at the tips. The number of nozzles for the unit shown in FIG. 3, may be as desired.

The rotor unit shown in FIG. 4, may have one or more nozzles, as desired. The nozzles may be either converging, or converging-diverging shape, as required for the fluid being used. The fluid velocity leaving these nozzles, related to the nozzle velocity, should be highest attainable, for the pressure and enthalpy differential available between the entry and exit ends of said nozzles. The guide vanes, 13, may be oriented as desired; these vanes may not be required with all fluids; purpose of these vanes is to minimize turbulence within said rotor cavity.

The turbine stage of this invention may be used with fluids such as steam, air, various other gases and with liquids such as water. In hydraulic power plants, using water from a dam as the pressurized entry fluid, the unit may be conveniently placed with the rotor horizontal and the axis vertical, with the water entering inlet 21 from above. In most installations, it would be desirable to control the unit by having suitable adjustable inserts at the nozzles 18 to control fluid flow; similarly, the nozzles of rotor 14 may be adjustable to control fluid flow; devices to provide for these controls and adjustments are not part of this invention and are not further described herein.

To explain further the operation of the reaction rotor stage of this invention, it should be noted that by accelerating said fluid in the said stationary feeder nozzles 18 to the tangential speed of the said rotor 14, there is no work required to acclerate said fluid to said speed in said rotor; except to the extent that the tangential velocity of said rotor differs from the velocity of said entering fluid. Therefore, the work output produced when said fluid issues from said rotor 14 nozzles 12, is nearly all available at the rotor shaft to be passed to an external load as useful work. This is in contrast to an ordinary reaction rotor, where said fluid has to be first accelerated to the rotor speed, before said fluid is discharged from the reaction nozzles with the resultant reduction in useful work output.

The velocity of the fluid exiting from the fluid feeder nozzle opening 18 is higher than the velocity of the rotor at that radial distance. Preferably, the velocity of the fluid is at least as great as the velocity of the rotor at that radial distance. The greater the velocity of the fluid flowing out of the fluid feeder nozzle openings 18, the greater work that is realizable from the reaction rotor turbine employed as a power generation device.

Appropriate and well known equipment, controls and governors, are employed with the device described hereinbefore. They do not form any part of this invention and are not further described herein.

What is claimed is:

1. A turbine stage for power generation comprising:
   a. a reaction rotor for producing said power; said rotor being rotated at a predetermined speed; said rotor having reaction nozzles mounted near the periphery of said rotor; said reaction nozzles being oriented to discharge a fluid backward in a direction that is away from the direction of rotation of said rotor; said rotor being hollow and having a first cross sectional area at any radial distance that is greater than a second cross sectional dimension of said reaction nozzles so as to effect a peripheral pressure that is greater than the pressure at the inlet to the rotor downstream of a set of fluid feeder nozzles; said reaction nozzles being at least converging and sized and shaped to provide for maximum exit velocity attainable for said fluid from said nozzles relative to said rotor depending on the pressure and enthalpy differential available between entry and exit ends of said nozzles;
   b. a fluid feeder; said feeder being stationary and mounted concentrically interiorly of said rotor; said feeder being connected with a source of said fluid at an elevated pressure for supplying fluid to said reaction rotor; said feeder being equipped with fluid feeder nozzles arranged to discharge said fluid in a direction that is substantially the same as the tagential and at a speed greater than the speed of the reaction rotor in the area where said fluid enters said rotor; said fluid feeder nozzles being at least converging and sized and shaped to provide for highest attainable velocity for said fluid depending on the pressure differential available between entry and exit ends of said fluid feeder nozzles;
   d. a casing for providing support for said reaction rotor and said fluid feeder;
   e. a shaft connected with said rotor and journalled in said casing for supporting said rotating reaction rotor;
   f. bearing means disposed about said shaft for reducing friction; and
   g. fluid being flowed through said turbine stage from an inlet pressure upstream of said fluid feeder to a discharge pressure downstream of said reaction nozzles; said inlet pressure being greater than said discharge pressure; said fluid being flowed from said fluid feeder nozzles at a speed greater than the tangential velocity of said rotor at the same radial distance for effecting a greater power output on said shaft.

2. The turbine stage of claim 1 wherein said fluid is water.

3. The turbine stage of claim 1 wherein said fluid is a hot fluid such as steam for converting heat to power.

4. The turbine stage of claim 1 wherein said fluid is a liquid.

5. The turbine stage of claim 1 wherein said rotor has vanes disposed at a predetermined radial distance intermediate said fluid feeder and said reaction nozzles for minimizing turbulence in said rotor and improving the efficiency of compression of said fluid in said rotor.

6. A method of generating power in a reaction turbine comprising the steps of:
   a. accelerating a fluid to a first velocity and direction with respect to a radial extending outwardly from a central longitudinal axis of a fluid feeder;
   b. passing the accelerated fluid at said first velocity into a rotating rotor; said first velocity being greater than the tangential velocity of the rotor at the same radial distance from said axis; said direction being substantially tangential to said radial velocity direction;
   c. causing said fluid to flow in an arcuate radially outward path with sufficient angular velocity to cause sufficient centrifugal force to pressurize said fluid within said rotor such that the pressure of said fluid at the periphery of said rotor is greater than the pressure at the inlet to said rotor; and discharging said fluid through reaction nozzles mounted at the periphery of the rotating rotor in a direction that is opposite to the tangential direction of rotation for producing thrust and generating torque on the rotor and its shaft for producing power efficiently.

* * * * *